(12) United States Patent
Schraut et al.

(10) Patent No.: US 11,965,554 B2
(45) Date of Patent: Apr. 23, 2024

(54) WHEEL BEARING UNIT

(71) Applicant: Schaeffler Technologies AG & Co. KG, Herzogenaurach (DE)

(72) Inventors: Lukas Schraut, Werneck (DE); Bernd Barthel, Grettstadt (DE); Branko Katana, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/767,979

(22) PCT Filed: Sep. 2, 2020

(86) PCT No.: PCT/DE2020/100768
§ 371 (c)(1),
(2) Date: Apr. 11, 2022

(87) PCT Pub. No.: WO2021/093914
PCT Pub. Date: May 20, 2021

(65) Prior Publication Data
US 2024/0093731 A1   Mar. 21, 2024

(30) Foreign Application Priority Data
Nov. 11, 2019 (DE) ............ 10 2019 130 275.7

(51) Int. Cl.
*F16C 33/60* (2006.01)
*F16C 19/18* (2006.01)
(Continued)

(52) U.S. Cl.
CPC ............ *F16C 33/60* (2013.01); *F16C 19/18* (2013.01); *F16C 19/364* (2013.01);
(Continued)

(58) Field of Classification Search
CPC ........ F16C 19/18; F16C 19/364; F16C 19/38; F16C 19/386; F16C 19/48; F16C 19/541;
(Continued)

(56) References Cited

U.S. PATENT DOCUMENTS

| 4,798,482 A | 1/1989 | Kruk et al. |
| 4,997,294 A | 3/1991 | Hillmann |

(Continued)

FOREIGN PATENT DOCUMENTS

| CN | 106949147 A | 7/2017 |
| CN | 107524712 A | 12/2017 |

(Continued)

*Primary Examiner* — Phillip A Johnson

(57) ABSTRACT

A wheel bearing unit includes an outer ring, a first inner ring with a first axial end face, first rolling elements arranged between the outer ring and the first inner ring, a second inner ring with a second axial end face, facing the first axial end face, second rolling elements arranged between the outer ring and the second inner ring, and a sealing device for sealing an interface of the first inner ring and the second inner ring. The sealing device includes an annular retaining element and a sealing element provided on the annular retaining element. The sealing element is a sealing ring that includes first and second contact points contacting the annular retaining element, a third contact point contacting the first inner ring, and a fourth contact point contacting the second inner ring. At least one of the contact points has a flat face.

10 Claims, 4 Drawing Sheets

(51) Int. Cl.
*F16C 19/36* (2006.01)
*F16C 19/38* (2006.01)
*F16C 19/48* (2006.01)
*F16C 19/54* (2006.01)
*F16C 33/76* (2006.01)
*F16C 33/78* (2006.01)

(52) U.S. Cl.
CPC ............ *F16C 19/386* (2013.01); *F16C 19/48* (2013.01); *F16C 19/543* (2013.01); *F16C 33/768* (2013.01); *F16C 33/7816* (2013.01); *F16C 2326/02* (2013.01)

(58) Field of Classification Search
CPC .... F16C 19/542; F16C 33/60; F16C 33/7813; F16C 33/7816; F16C 33/768; F16C 2326/02
See application file for complete search history.

(56) References Cited

U.S. PATENT DOCUMENTS

| | | | | |
|---|---|---|---|---|
| 5,118,206 A | | 6/1992 | Otto et al. | |
| 5,213,342 A | * | 5/1993 | Weber | F16C 33/60 |
| | | | | 277/648 |
| 5,362,159 A | * | 11/1994 | Kufner | F16C 33/768 |
| | | | | 384/571 |
| 5,624,192 A | * | 4/1997 | Rigaux | G01P 3/446 |
| | | | | 384/446 |
| 6,227,713 B1 | * | 5/2001 | Neder | F16C 19/385 |
| | | | | 384/571 |
| 8,186,884 B2 | * | 5/2012 | Henneberger | F16C 33/768 |
| | | | | 384/477 |
| 2010/0002971 A1 | * | 1/2010 | Hosaka | F16C 19/386 |
| | | | | 384/486 |
| 2019/0055989 A1 | * | 2/2019 | Hamada | F16C 19/388 |

FOREIGN PATENT DOCUMENTS

| | | | | |
|---|---|---|---|---|
| DE | 9400067 U1 | | 3/1994 | |
| DE | 20009069 U1 | * | 10/2000 | ............ F16C 19/386 |
| DE | 10123677 A1 | | 11/2002 | |
| DE | 102009051556 A1 | | 5/2011 | |
| DE | 102014200709 A1 | | 7/2015 | |
| DE | 102018130926 A1 | | 6/2020 | |
| GB | 2264757 A | * | 9/1993 | .............. F16C 13/02 |
| JP | 2006283944 A | * | 10/2006 | ............ F16C 19/386 |
| JP | 2008008408 A | | 1/2008 | |
| JP | 2001099172 A | | 11/2008 | |
| JP | 2009156421 A | * | 7/2009 | ............ F16C 19/388 |
| JP | 2010025216 A | | 2/2010 | |
| JP | 2011148409 A | | 8/2011 | |
| JP | 2015016778 A | * | 1/2015 | |
| WO | 9742425 A1 | | 11/1997 | |
| WO | WO-2015166883 A1 | * | 11/2015 | ............ F16C 19/388 |

\* cited by examiner

WHEEL BEARING UNIT

CROSS-REFERENCE TO RELATED APPLICATIONS

This application is the United States National Phase of PCT Appln. No. PCT/DE2020/100768 filed Sep. 2, 2020, which claims priority to German Application No. DE102019130275.7 filed Nov. 11, 2019, the entire disclosures of which are incorporated by reference herein.

TECHNICAL FIELD

The present disclosure relates to a wheel bearing unit, in particular for motor vehicles.

BACKGROUND

Wheel bearing units with preassembled press-fit roller bearing units, for example for commercial vehicles, are used when a proper installation of a wheel bearing, which usually consists of at least two wheel bearing units, is not possible in an automotive workshop.

For the installation of a wheel bearing, a clean working environment and numerous precautions are indispensable for proper installation. Unfortunately, these measures cannot be complied with under certain conditions. As a rule, contamination of the rolling space usually results in a loss of wheel bearing service life. The same problem arises with other types of bearings, especially in the automotive sector.

The use of exchangeable wheel bearing units is conceivable, the rolling space of which does not have to be opened during installation and thus there is no risk of contamination of the rolling space. However, in this case, the cost of materials is relatively high, making the wheel bearing expensive.

For this reason, so-called insert wheel bearing units, in particular insert tapered roller bearing units, have been developed in the past, which can be delivered and transported in a pre-installed state without unnecessarily revealing the rolling space during installation or otherwise. In the pre-assembled state, the insert wheel bearing units are pressed laterally into the wheel carrier or into or onto the wheel hub.

Such tapered roller bearings have axially and radially acting sealing means, and the radially acting sealing means seals a gap between two inner rings whose end faces are in contact. In several exemplary embodiments, the sealing ring is arranged on the radial inner side of the two inner rings in a common annular groove, which is formed by depressions in the region of the mutually facing end faces of the two inner rings. The common annular groove formed by these depressions to receive the sealing ring has a rectangular cross-sectional geometry in each case.

To achieve the desired sealing properties, which are also intended to allow pressure equalization between the inside space of the bearing and the environment or to permit ventilation thereof, the sealing ring, which is designed differently in variants, includes a metallic clamping element in each case, which exerts a radial contact pressure on the sealing ring in the direction of the inner rings forming the annular groove and secures it in the annular groove as well as allowing pressure equalization. In this respect, the known sealing rings are all comparatively expensive rubber metal components which, due to their design, do not allow hermetic sealing of the inside space of the roller bearing.

Also known from WO 97/42425 A1 is a double-row tapered roller bearing installed as a wheel bearing in a wheel hub of a vehicle. The two-piece inner ring of this tapered roller bearing is protected against the ingress of undesirable substances, such as oil from the region of a vehicle axle, by means of a sealing system which covers the adjacent end faces of the two inner rings and is arranged in the inside space of the bearing. This sealing system consists of two O-rings, one of which is formed in an associated annular groove on the outer circumference of each of the inner rings. The two O-rings are also radially surrounded by a metallic ring, which presses them against the associated inner rings in a sealing manner. A comparable design is exhibited by a four-row roller bearing known from DE 39 15 624 A1, but no O-rings are used there. This design uses differently designed sealing means, which are inserted into a common annular groove of rectangular cross-section on the inner rings and are held by a sheet metal ring.

A double-row roller bearing is known from DE 36 21 381 A1, which has multi-part inner rings and outer rings. With this roller bearing, the outer rings are axially spaced apart from one another by means of a spacer ring, while the inner rings are connected by means of a mounting ring with a U-shaped cross-section, the legs of which engage in respectively assigned circumferential grooves in the inner rings.

In this roller bearing, the outer rings are axially spaced from one another by means of a spacer ring, while the inner rings are connected by means of a mounting ring with a U-shaped cross-section, the legs of which engage in respectively assigned circumferential grooves in the inner rings. In both cases, a deterioration of the properties and a shortening of the bearing life of the roller bearing can be expected. In some embodiments, for example, there is criticism of inadequate axial bracing of the two inner rings against one another, so that foreign matter can overcome the seal located in the region of the parting line between their end faces. Insofar as in other embodiments the seal can be pressed against the inner rings by means of a separate sheet metal ring or by a sheet metal ring incorporated in their rubber material with an effect sufficient for sealing purposes, these sealing rings are judged to be comparatively expensive to manufacture.

SUMMARY

The present disclosure provides a wheel bearing unit that reliably seals against external influences.

According to the disclosure, a wheel bearing unit includes at least one outer ring and at least two inner rings, between which there are rolling elements guided in a cage, two adjacent inner rings bearing against each other by their mutually facing axial end faces, and a sealing device being provided to seal an interface of the two inner rings. The sealing device is formed by an annular retaining element, and at least one sealing element is provided on the retaining element. The sealing element is in the form of a sealing ring which has at least two contact points which are in contact with the retaining element and at least one contact point which is in contact with each inner ring, with at least one of the contact points being designed such that it has a flat face.

Center seals known from the prior art are axially tensioned and thus seal axially. However, insufficient axial tensioning of the wheel bearing unit results in the center seal being insufficiently axially tensioned and thus not sealing properly.

According to the disclosure, a sealing element is provided in the retaining element of the sealing device that is designed in such a way that it has at least two radial contact points which are in contact with the retaining element and at least one radial contact point which is in contact with each inner ring, and at least one of the contact points is designed in such a way that it has a flat face. This flat face increases the adhesion forces that occur in the region of the sealing device, which can increase the sealing performance. In the case of pointed surfaces known from the prior art, an additional medium may be necessary to exert the required pressure on the seal. According to the disclosure, the contact points and their contact zones remain unchanged throughout the service life. Furthermore, the flat face prevents sealing elements from folding over during the course of the service life. Accordingly, in accordance with the disclosure, a hermetically sealing and self-locking sealing device is provided which reliably and with little effort prevents the ingress of foreign substances and/or the migration of lubricant via the abutting end faces of the inner rings into or out of that space of the wheel bearing unit in which the rolling elements are arranged.

According to an embodiment, the sealing element has at least one lead-in chamfer, and the lead-in chamfer is formed from a first angle and a second angle. The size of the angle generally depends on the lead-in chamfers of the surrounding components. The first angle is at least 15°. The second angle is designed to be somewhat steeper and is at least 20°. The lead-in chamfers allow the sealing element to be simply pushed onto the inner ring.

The sealing element may have a minimum contour thickness depending on the material hardness. To ensure that the sealing effect is not reduced, the minimum contour thickness must be selected in such a way that, in combination with the selected material hardness, it exerts sufficiently large contact forces of the sealing lips on the surrounding components to guarantee a sufficient sealing effect. The minimum contour thickness is also selected in such a way that, in the presence of media and possibly chemical surface stresses, as well as temperature stresses on the sealing element material, the basic sealing function continues to be provided by a sufficiently unimpaired core material. For example, a ratio of the minimum contour thickness to the minimum height of the sealing element can be 85 Shore A: Min 6:1 or 70 Shore A: Min 8:1.

According to an embodiment, the sealing device is arranged in a common annular groove of the inner rings, which is formed by depressions in the region of the mutually facing end faces of the inner rings. By providing the sealing device, sufficient radial tensioning of the sealing element can be achieved. In addition, the depressions form edges on the respective inner ring, which simultaneously serve to align, center and position the sealing device.

According to an alternative embodiment, the retaining element is designed in a U-shape and has two side rings which are connected by means of a circumferential web. This ensures that the sealing element is held securely in the retaining element during assembly and operation of the wheel bearing unit. In addition, this can prevent axial displacements of the sealing element.

At least one of the side rings may form a positioning aid which is centered and positioned on an edge of the annular groove.

At least one of the side rings may have at least one interruption. Several interruptions may be provided evenly distributed around the circumference on both side rings. This enables cost-effective demolding during manufacture of the retaining element. In addition, this design of the retaining element facilitates assembly of the sealing element, as well as final assembly on the wheel bearing unit.

According to an embodiment, the sealing ring is made of a rubber elastic material. This makes it possible to achieve particularly good nesting of the sealing element in the retaining element.

The retaining element may be made of a plastic.

The rolling elements may be designed as tapered rollers. However, the rolling elements can also be needle rollers, cylindrical rollers, barrel rollers or ball rollers, which are suitable for heavy commercial vehicles, or for high load transmission. Alternatively, spherical rolling elements are also conceivable.

BRIEF DESCRIPTION OF THE DRAWINGS

Two exemplary embodiments of the disclosure are shown below with reference to the figures. In the figures.

DETAILED DESCRIPTION

Figure 1:
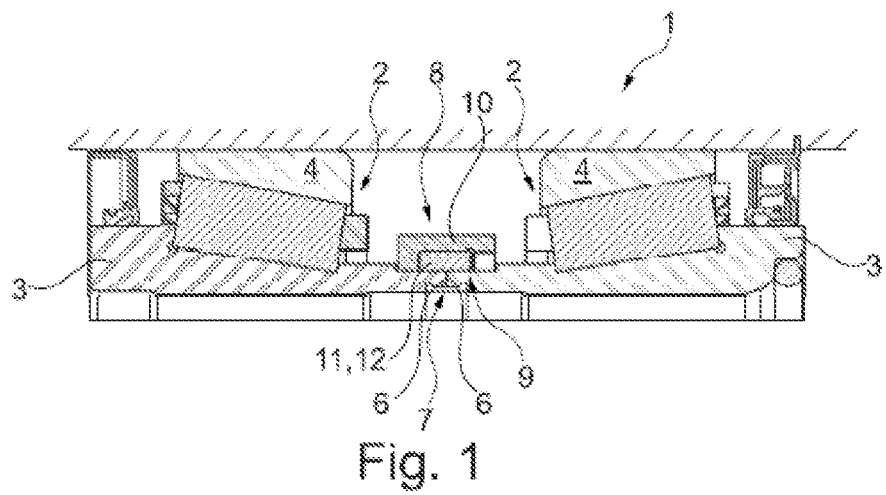
FIG. 1 shows a longitudinal section through a wheel bearing unit according to the disclosure.

FIG. 1 shows a longitudinal section through a wheel bearing unit 1 according to the disclosure. The wheel bearing unit is designed as a double-row tapered roller bearing 2. The tapered roller bearing 2 has an inner ring 3 and an outer ring 4. Tapered rollers are arranged between the running surfaces formed by the inner ring 3 and the outer ring 4, which roll on the running surfaces.

One end face 6 of each of the two inner rings 3 bears against the other and thus forms an interface 7. A sealing device 8 is provided to seal this interface 7. As can be seen from FIG. 1, the two inner rings 3 form an annular groove 9. This is formed by corresponding depressions in the two inner rings 3.

Figure 2:
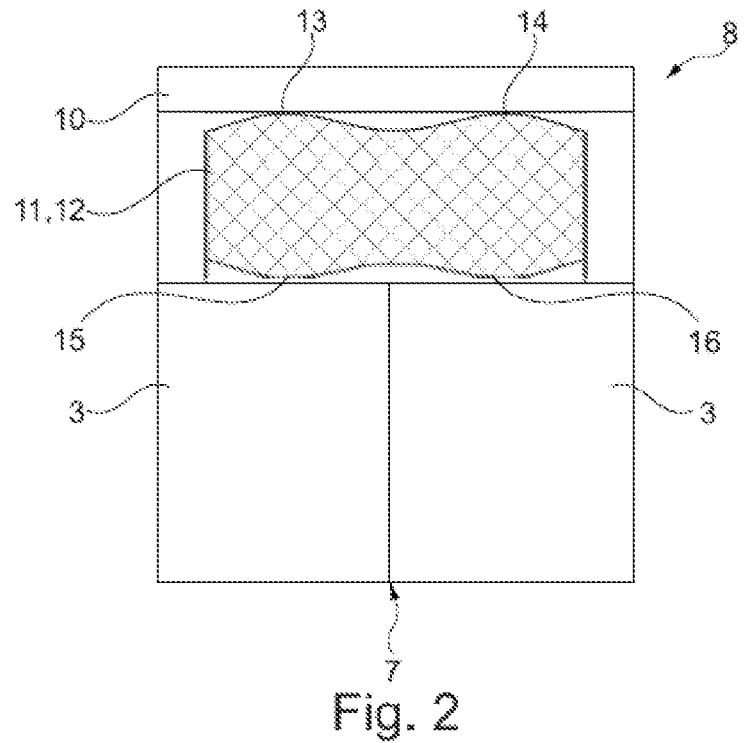
FIG. 2 shows a longitudinal section through a sealing device of the wheel bearing unit according to the disclosure.
Figure 3:
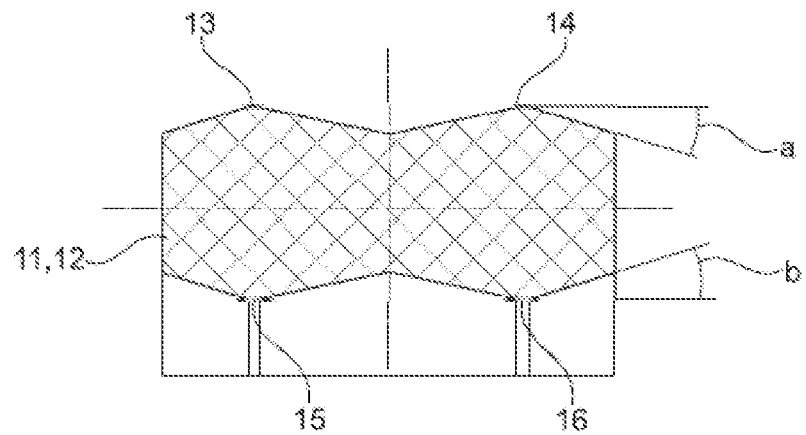
FIG. 3 shows a longitudinal section through a sealing device of the wheel bearing unit according to the disclosure.
Figure 4:
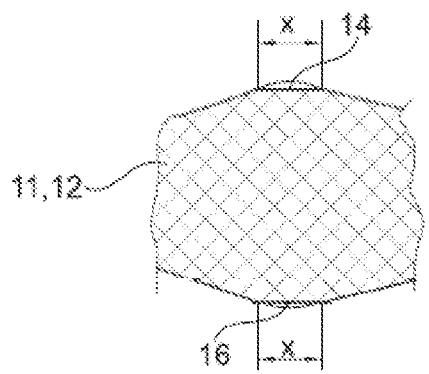
FIG. 4 shows an enlarged view of the sealing device shown in FIG. 3.

The sealing device 8 is formed by an annular retaining element 10, on which at least one sealing element 11 is provided. The sealing element is designed as a sealing ring 12. The sealing ring 12 is made of a rubber elastic material. For a more detailed explanation of the sealing element 11, reference is now made to FIGS. 2, 3 and 4. The sealing ring 12 has two contact points 13, 14, which contact the retaining element 10, and one contact point 15, 16, which contacts each inner ring 3. By means of this special design, the sealing ring 12 is pressed radially against the inner rings 3 during installation and radially tensioned accordingly. So, even if the inner rings 3 are displaced axially, the radial sealing or radial tensioning of the sealing element 11 remains unaffected.

At least one of the contact points 13, 14, 15, 16 is designed in such a way that it has a flat face X. This flat face increases the adhesion forces that occur in the region of the sealing device 8, which can increase the sealing performance. In the case of pointed surfaces of the sealing element 11 known from the prior art, an additional medium may be necessary to exert the required pressure on the seal. Another advantage of the embodiment according to the disclosure is that the contact points 13, 14, 15, 16 and their contact zones remain unchanged throughout the service life. Furthermore, the flat face prevents sealing elements 11 from folding over during the course of the service life.

The sealing element 11 has at least one lead-in chamfer formed from a first angle a and a second angle b. The size of the angle a, b generally depends on the lead-in chamfers of the surrounding components. The first angle is at least 15° and the second angle is designed to be somewhat steeper and is at least 20°. The lead-in chamfers allow the sealing element 11 to be simply pushed onto the inner ring 3.

Figure 5:
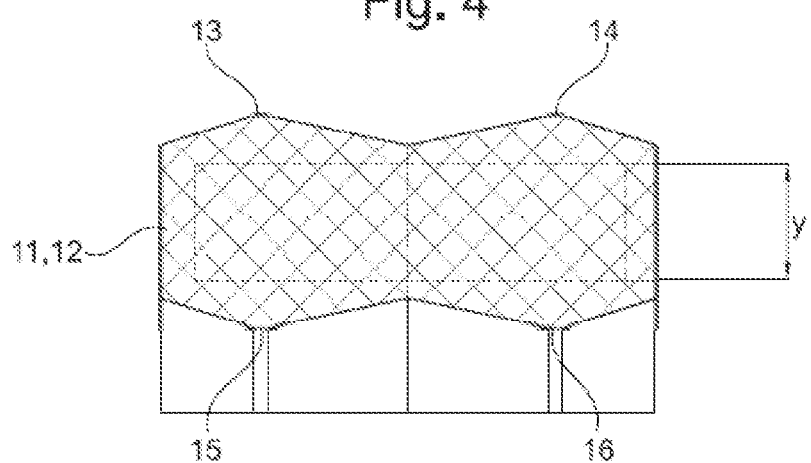
FIG. 5 shows a longitudinal section through a sealing device of the wheel bearing unit according to the disclosure.

As can also be seen from FIG. 5, the sealing element 11 has a minimum contour thickness y. The minimum contour thickness depends on the hardness of the material. To ensure that the sealing effect is not reduced, the minimum contour thickness must be selected in such a way that, in combination with the selected material hardness, it exerts sufficiently large contact forces of the sealing element 11 on the surrounding components to guarantee a sufficient sealing effect. The minimum contour thickness is also selected in such a way that, in the presence of media and possibly chemical surface stresses, as well as temperature stresses on the sealing element material, the basic sealing function continues to be provided by a sufficiently unimpaired core material.

Figure 6A:
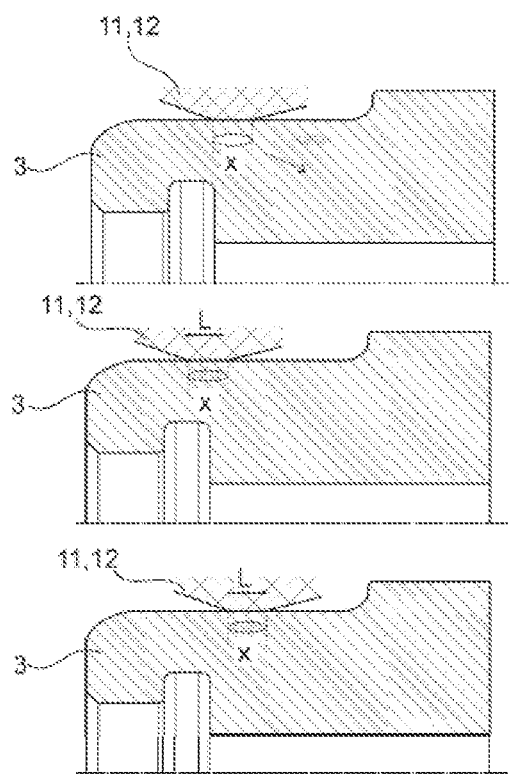
FIG. 6a shows an illustration of the change in position of the sealing device of the wheel bearing unit according to the disclosure.
Figure 6B:
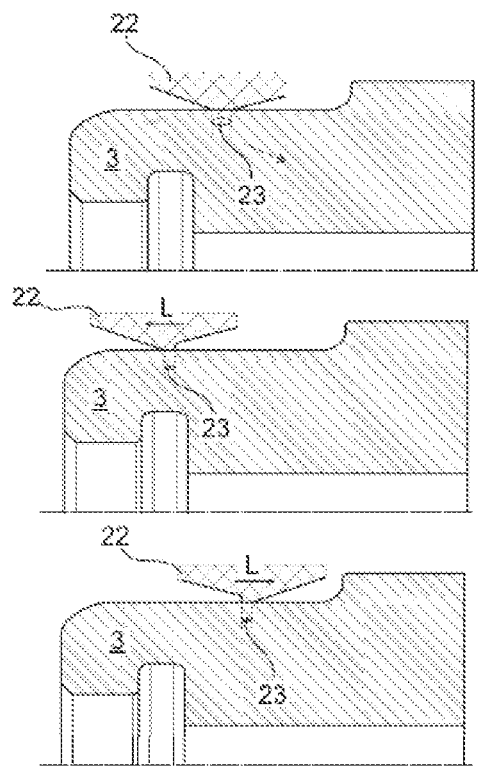
FIG. 6b shows an illustration of the change in position of the sealing device of a wheel bearing unit known from the prior art.

FIGS. 6a and 6b show a change in position of the sealing device of the wheel bearing unit according to the disclosure as well as a wheel bearing unit known from the prior art. FIG. 6a shows the embodiment according to the disclosure and FIG. 6b uses a sealing element 22 from the prior art. As can be seen from FIG. 6a, the sealing effect of the sealing element 11 is independent of a change in position of the sealing element 11 during an axial movement L of the seal itself or of the inner ring 3. The contact points 13, 14, 15, 16 are designed as a flat face X and remain the same during any movement. In contrast, FIG. 6b shows that the contact points 23 are affected by an axial movement L of the sealing element 22. The pointed contact points 23 fold over during the axial movement L and the contact points are thus minimized after a change in position.

Figure 7:
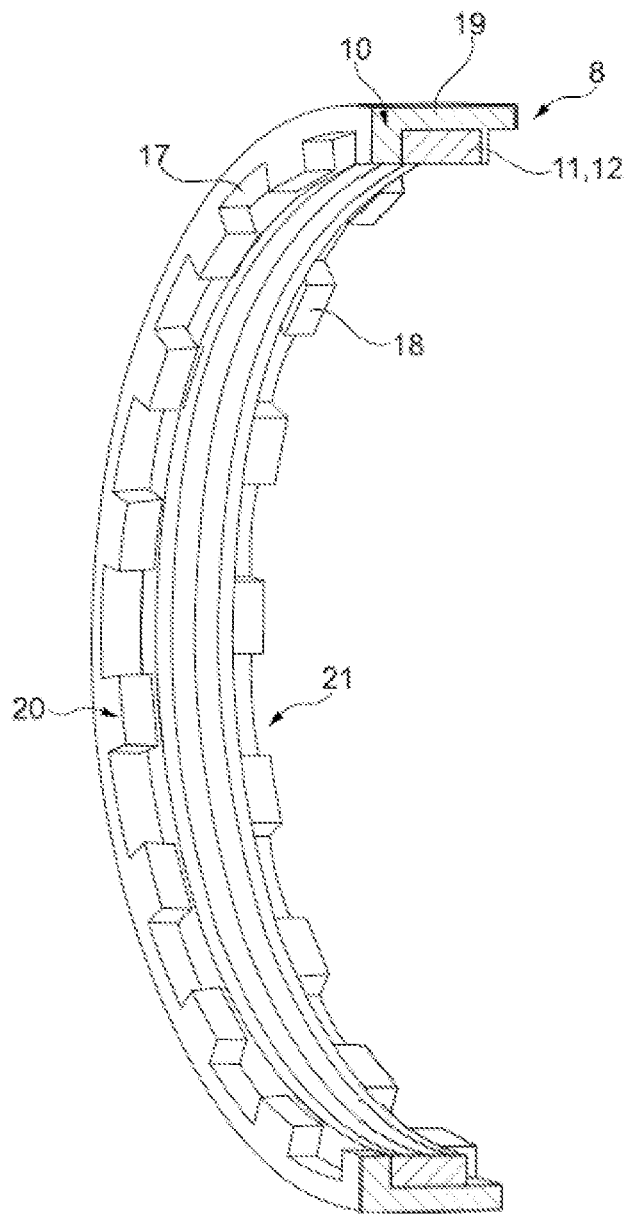
FIG. 7 shows a perspective view of the sealing device of the wheel bearing unit according to the disclosure.

FIG. 7 shows a design of the sealing device 8. The retaining element 10 is designed in a U-shape and has two side rings 17, 18 which are connected by means of a circumferential web 19. This ensures a secure hold of the sealing element 11 in the retaining element 8.

As can also be seen, the side rings are designed in such a way that they have several interruptions 20, 21 distributed around the circumference. The side rings 17, 18 simultaneously form a positioning aid Which is centered and positioned on an edge of the annular groove 9.

REFERENCE NUMERALS

1 Wheel bearing unit
2 Tapered roller bearing
3 Inner ring
4 Outer ring
5 Tapered rollers
6 End face
7 Interface
8 Sealing device
9 Annular groove
10 Retaining element
11 Sealing element
12 Sealing ring
13 Contact point
14 Contact point
15 Contact point
16 Contact point
17 Side rings
18 Side rings
19 Web
70 Interruption
71 Interruption
22 Sealing element, prior art
23 Contact points
X Flat face
a First angle
b Second angle
y Minimum contour thickness
L Axial movement

The invention claimed is:

1. A wheel bearing unit comprising:
an outer ring;
a first inner ring comprising a first axial end face;
first rolling elements arranged between the outer ring and the first inner ring and guided in a first cage;
a second inner ring comprising a second axial end face, facing the first axial end face;
second rolling elements arranged between the outer ring and the second inner ring and guided in a second cage; and
a sealing device for sealing an interface of the first inner ring and the second inner ring, the sealing device comprising:
an annular retaining element; and
a sealing element provided on the annular retaining element, wherein:
the sealing element is a sealing ring comprising:
first and second contact points contacting the annular retaining element;
a third contact point contacting the first inner ring; and
a fourth contact point contacting the second inner ring; and
at least one of the contact points comprises a flat face.

2. The wheel bearing unit of claim 1, wherein:
the sealing element comprises a lead-in chamfer; and
the lead-in chamfer is formed from a first angle and a second angle.

3. The wheel bearing unit of claim 1, wherein the sealing element comprises:
a material comprising a hardness; and
a minimum contour thickness depending on the hardness.

4. The wheel bearing unit of claim 1, wherein:
the first inner ring and the second inner ring comprise respective depressions in a region of the first axial end face and the second axial end face;
the respective depressions form a common annular groove; and
the sealing device is arranged in the common annular groove.

5. The wheel bearing unit of claim 4, wherein the annular retaining element is designed in a U-shape comprising:
a circumferential web; and
two side rings connected by the circumferential web.

6. The wheel bearing unit of claim 5, wherein one or both of the two side rings forms a positioning aid that is centered and positioned on an edge of the common annular groove.

7. The wheel bearing unit of claim 5, wherein one or both of the two side rings comprises an interruption.

8. The wheel bearing unit of claim 1, wherein the annular retaining element is designed in a U-shape comprising:
   a circumferential web; and
   two side rings connected by the circumferential web.

9. The wheel bearing unit of claim 1, wherein the sealing ring is made of a rubber elastic material.

10. The wheel bearing unit of claim 1, wherein the annular retaining element is made of a plastic.

\* \* \* \* \*